W. L. BROWN & A. J. MEUWLY.
ENGINE ROD CONNECTION.
APPLICATION FILED SEPT. 26, 1913.

1,152,876.

Patented Sept. 7, 1915.

Witnesses,

Inventors,
William L. Brown
Alex J. Meuwly

UNITED STATES PATENT OFFICE.

WILLIAM LEE BROWN AND ALEX J. MEUWLY, OF LITTLE ROCK, ARKANSAS.

ENGINE-ROD CONNECTION.

1,152,876.

Specification of Letters Patent.

Patented Sept. 7, 1915.

Application filed September 26, 1913. Serial No. 791,970.

*To all whom it may concern:*

Be it known that we, WILLIAM L. BROWN and ALEX J. MEUWLY, citizens of the United States, and residents of Little Rock, county of Pulaski, and State of Arkansas, have invented an Improvement in Engine-Rod Connections, of which the following description, in connection with the accompanying drawings, is a specification, like letters on the drawings representing like parts.

The invention to be hereinafter described relates to engine rod connections, and more particularly to the connections between an engine cross-head or piston and the rod or rods for transmitting power to or from said parts.

The aims and purposes of the present invention are to provide a pin for connecting a rod to a cross-head, piston or other part of an engine, whereby as the relatively moving parts of the connection wear in use, the pin will act automatically to take up such wear, and maintain the parts in the new relation, thereby doing away with the objectionable rattle, noise, and loose relation of the parts incident to the old construction, and prolonging the life of the connections,—all as will hereinafter more fully appear in connection with the accompanying drawing of one practical embodiment of the invention, which in its true scope, is definitely described by the claims.

Figure 1:
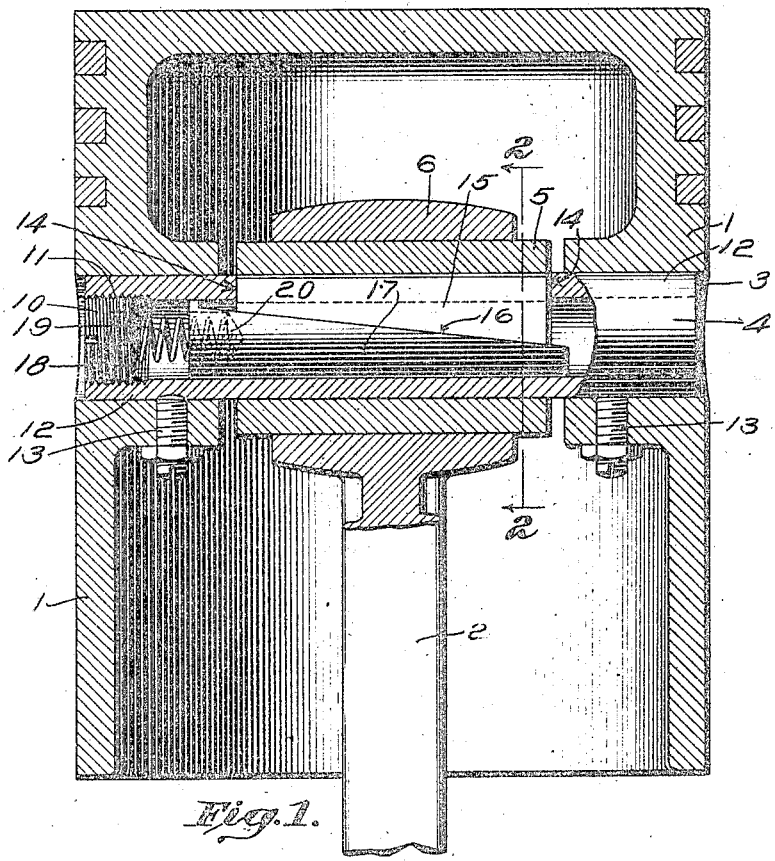
Figure 2:
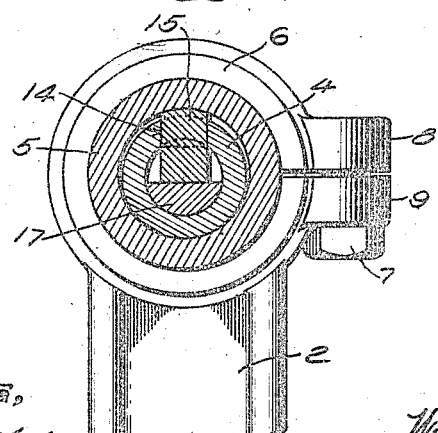

In the drawing:—Figure 1 is a sectional view of an engine piston having the connecting rod joined thereto by a pin embodying the present invention; and Fig. 2 is a cross-section on the line 2—2, Fig. 1.

While in the exploitation of the present invention, the pin is illustrated as applied between the piston and connecting rod of a gas engine, it is to be understood that the invention is not restricted thereto, but that the pin may be used in other relations where a rod is to be connected to an engine part for transmitting power, as for instance, between the cross-head and connecting rod, or other like parts.

In the drawing, 1 represents the piston of an ordinary gas engine which may be of usual or any preferred construction, and 2 represents the connecting rod for transmitting power from the piston 1 to the crank shaft or other movable part of the gas engine. Mounted in bearings 3 of the piston 1 is a hollow pin 4 surrounded, it may be, by a bronze or other bushing 5 which is itself connected to the rod 2 by a suitable clamp or embracing part 6. This clamp or embracing part 6 may be formed as indicated in Fig. 2, or otherwise, the construction in these respects forming no essential part of the present invention. As indicated in Fig. 2 the parts of the clamp 6 for connecting the rod 2 with the hollow pin 4 may be forced together by a screw bolt 7 engaging the lugs 8 and 9 formed in the two parts of the clamp 6, said form of connection having been found a convenient manner for such connection, although other forms of connection may be advantageously employed, the essential in this respect being that some means be provided for connecting the rod 2 to the hollow pin 4.

The pin 4 may be conveniently formed as a continuous hollow tube, as indicated by Fig. 1, and one end thereof may be closed by a screw plug 10, adapted to engage suitable screw threads 11 on the interior of the hollow pin 4, substantially as indicated in Fig. 1. The hollow pin 4 has end bearing portions 12 which rest in the bearings 3 of the piston 1, and is secured from rotative movement therein by any suitable means such as the clamping screws 13, the construction being such that as the piston moves rectilinearly and the connecting rod 2 oscillates about the pin 4, any wear occurring between the parts will take place between the bearings 12 of the pin 4, either in the pin itself or the part of the connecting rod which surrounds it. Between the bearing portions 12 the pin 4 is provided with a longitudinal opening 14 through which projects a wedge 15 extending longitudinally of the pin 4 and having its wedge surface 16 within the pin. From this construction it will be apparent that the wedge 15 may move radially with respect to the pin 4 through the recess or opening 14 between the bearings 12 of said pin. Bodily contained within the hollow pin 4 is a second wedge 17, the wedging surface of which engages and coacts with the wedging surface 16 of the wedge 15. The wedge 17, like the wedge 15, extends longitudinally of the pin 4 and preferably has its larger end 18 fitting the bore of the hollow pin, the construction being such that any movement of the wedge 17 longitudinally of the pin 4 to the right, as indicated in Fig. 1, will cause outward movement of the wedge 15 and thereby take up any wear or lost motion that may occur between the connecting rod and pin as indicated in Fig. 2. The position of the wedges 15 and 17 carried by the hollow pin 4, is such that the wedge 15 is preferably moved radially of the pin 4 substantially in the line of power thrust between the piston and connecting rod 2; in other words, these wedges are preferably arranged with relation to the hollow pin 4 that their longitudinal axis or dimension shall be in the plane passing through the line of thrust, although in some cases this may be varied.

Interposed between the closed end of the hollow pin 4 and the larger end of the wedge 17 is a spring 19, Fig. 1, normally acting to force the wedge 17 longitudinally to the right, Fig. 1, so that the inclined surfaces of the two wedges 15 and 17 shall normally act to thrust the wedge 15 radially outward of the pin 4, thereby automatically taking up any wear that may occur between the moving parts. As a preferred form of construction, the spring 19 has one end seated in a recess 20 in the larger end of the wedge 17, and the opposite end of said spring may be similarly seated in a recess at the closed end of the pin, substantially as indicated in Fig. 1.

From the construction described, it will be apparent that the hollow pin 4 has extending longitudinally thereof the two wedges 15 and 17, and that the spring acting upon the larger end of the wedge 17 normally tends to force the wedge 15 outward in a radial direction, while said wedge 15 is maintained from longitudinal movement of the hollow pin 4 by the end walls of the recess or opening 14 between the bearing portions 12 of the said pin, thereby taking up any wear between the moving parts, connecting the rod to the pin, and overcoming any lost motion or rattle that would otherwise occur between said parts.

In the form of the invention illustrated, one end of the hollow pin 4 is shown as closed by the screw plug 10, and such screw plug forms a convenient means for the assemblage of parts, and the adjustment of the spring tension acting upon the wedge 17, but if desired, one end of the hollow pin 4 may be permanently closed within the true scope of the invention, in which case the parts will be assembled from the open end of the hollow pin 4, at the right, Fig. 1.

Obviously, changes may be made in the details of parts without departing from the invention, which is characterized by a hollow pin having the two coöperating wedges 15 and 17 longitudinally arranged with respect thereto, one of said wedges 17 being movable bodily longitudinally within the hollow pin, and the other wedge 15 being movable radially through an opening formed between the bearing portions of said pin by such longitudinal movement of the wedge 17.

What is claimed is:—

1. An engine rod connection, comprising a hollow pin closed at one end and provided with an opening between the end portions thereof extending longitudinally of the hollow pin, a wedge having an edge portion inclined in the same direction throughout the length of the wedge and extending longitudinally of the hollow pin in said longitudinal opening, a second wedge within said hollow pin of greater length than the first-named wedge and having a straight edge portion resting on the interior surface of the hollow pin, and means acting automatically to move said second wedge longitudinally of the said hollow pin to force the first-named wedge outwardly.

2. An engine rod connection, comprising a hollow pin having a longitudinal opening at one side, a wedge extending through said opening and having an inclined edge formed in a single plane throughout the length of the wedge, a second wedge movable longitudinally within the hollow pin and of greater length than the first-named wedge, said second wedge having a circularly curved bearing portion conforming to and resting upon the interior surface of the hollow pin and an inclined edge formed in a single plane to conform to the inclined edge of the first-named wedge, a spring acting upon one end of the second wedge, and means for adjusting the tension of the spring.

3. In an engine rod connection, the combination of a movable engine part, a hollow pin secured from rotative movement to said part and provided with a longitudinal opening, a connecting rod having an end embracing said hollow pin, a wedge having an inclined edge portion formed in a single plane and extending longitudinally of the hollow pin within said opening and movable radially of the hollow pin, a second wedge member of greater length than the first-named wedge and movable longitudinally within the hollow pin, said second wedge having an inclined edge formed in a single plane to coöperate with the inclined edge of the first-named wedge, and a cylindrically curved surface to conform to and rest upon the interior surface of the hollow pin, and adjustable means acting automatically for forcing said second wedge member longitudinally of the hollow pin to move the first-named wedge radially and take up wear.

4. An engine rod connection comprising a hollow pin provided with a longitudinal opening through the cylindrical wall thereof, a wedge having an inclined edge portion formed in a single plane, said wedge extending longitudinally of the hollow pin within said opening through the cylindrical wall of the pin and movable radially thereof, a second wedge movable longitudinally within the hollow pin, said second wedge having a straight inclined edge formed in a single plane to coöperate with the inclined edge of the first-named wedge and having a surface bearing on the interior of the hollow pin, and spring means acting automatically to force said second wedge longitudinally of the hollow pin while maintaining its surface bearing on the interior of said pin and the said inclined edge portions of the two wedges in contact for forcing the first-named wedge radially.

In testimony whereof, we have signed our names to this specification, in the presence of two subscribing witnesses.

WILLIAM LEE BROWN.
ALEK JOHN MEUWLY.

Witnesses:
OSCAR A. SCHAAD,
BEN D. SCHAAD.